United States Patent
Hotra

(10) Patent No.: US 12,222,842 B2
(45) Date of Patent: Feb. 11, 2025

(54) VIRTUAL MACHINE FOR DEVELOPING AND TESTING TARGET CODE FOR HARDWARE DESIGNS

(71) Applicant: THE BOEING COMPANY, Chicago, IL (US)

(72) Inventor: Jonathan Nicholas Hotra, Maryland Heights, MO (US)

(73) Assignee: The Boeing Company, Arlington, VA (US)

(*) Notice: Subject to any disclaimer, the term of this patent is extended or adjusted under 35 U.S.C. 154(b) by 155 days.

(21) Appl. No.: 17/409,516

(22) Filed: Aug. 23, 2021

(65) Prior Publication Data
US 2022/0066911 A1 Mar. 3, 2022

Related U.S. Application Data

(60) Provisional application No. 63/070,555, filed on Aug. 26, 2020.

(51) Int. Cl.
G06F 11/36 (2006.01)
G06F 9/455 (2018.01)

(52) U.S. Cl.
CPC ...... *G06F 11/3664* (2013.01); *G06F 9/45508* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 5,546,562 A * | 8/1996 | Patel | G06F 30/33 |
| | | | 714/33 |
| 8,966,478 B2 | 2/2015 | Hotra et al. | |
| 9,003,405 B1 | 4/2015 | Hotra | |
| 9,323,576 B2 | 4/2016 | Hotra et al. | |
| 9,917,855 B1 * | 3/2018 | Li | H04L 63/1408 |

(Continued)

FOREIGN PATENT DOCUMENTS

| | | |
|---|---|---|
| CN | 104133378 B | 11/2014 |
| CN | 105160957 A | 12/2015 |

(Continued)

OTHER PUBLICATIONS

Bridges et al., "Virtual-machine-based emulation of future generation high-performance computing systems," SAGE, 2012, 11pg. (Year: 2012).*

(Continued)

*Primary Examiner* — Ryan D. Coyer
(74) *Attorney, Agent, or Firm* — Alleman Hall & Tuttle LLP

(57) ABSTRACT

A host computer includes a memory storing a proxy VM, and a host CPU. The proxy VM emulates target hardware having an incomplete design. The proxy VM includes a virtual processor for emulating a target processor. The proxy VM includes an emulated memory coupled to the virtual processor over a virtual memory bus. The emulated memory includes at least one portion storing the target code. The host CPU is configured to execute the proxy VM to emulate the target hardware. The proxy VM, upon execution by the host CPU, is configured to execute, by the virtual processor, the target code.

23 Claims, 5 Drawing Sheets

(56) References Cited

U.S. PATENT DOCUMENTS

| | | | |
|---|---|---|---|
| 10,108,445 B2 | 10/2018 | Hotra | |
| 10,289,442 B1 | 5/2019 | Hotra | |
| 10,725,890 B1* | 7/2020 | Goyal | H04L 63/029 |
| 2006/0004554 A1 | 1/2006 | Vega et al. | |
| 2006/0146057 A1* | 7/2006 | Blythe | G06F 9/45533 |
| | | | 345/506 |
| 2007/0168953 A1* | 7/2007 | Diez | G06F 9/45537 |
| | | | 717/148 |
| 2009/0249333 A1* | 10/2009 | Yamaguchi | G06F 9/455 |
| | | | 718/1 |
| 2011/0246171 A1* | 10/2011 | Cleeton | G06F 9/45558 |
| | | | 718/1 |
| 2014/0331209 A1* | 11/2014 | Singh | G06F 11/3688 |
| | | | 717/127 |
| 2015/0356031 A1* | 12/2015 | Gintis | G06F 13/102 |
| | | | 710/61 |
| 2016/0246341 A1* | 8/2016 | Burrell | G06F 1/3231 |
| 2016/0371407 A1* | 12/2016 | Larzul | G06F 30/20 |
| 2017/0083652 A1* | 3/2017 | Larzul | G06F 30/331 |
| 2017/0097842 A1* | 4/2017 | Bugenhagen | G06F 13/102 |
| 2017/0116024 A1* | 4/2017 | Ghosh | G06F 9/45558 |
| 2018/0357150 A1 | 12/2018 | Chaubey et al. | |
| 2019/0026204 A1 | 1/2019 | Hotra | |
| 2019/0068456 A1* | 2/2019 | Lotfi | G06F 11/2007 |
| 2019/0121745 A1* | 4/2019 | Hoppert | G06F 9/45558 |
| 2019/0303188 A1 | 10/2019 | Shelton et al. | |
| 2020/0133705 A1* | 4/2020 | Hotra | G06F 30/20 |

FOREIGN PATENT DOCUMENTS

| | | | | | |
|---|---|---|---|---|---|
| CN | 206097684 | U | | 4/2017 | |
| CN | 108629837 | A | | 10/2018 | |
| CN | 109509243 | A | | 3/2019 | |
| CN | 110246227 | A | | 9/2019 | |
| CN | 110308997 | A | | 10/2019 | |
| CN | 110532300 | A | | 12/2019 | |
| EP | 3435229 | A1 | | 1/2019 | |
| EP | 364956 | A1 | | 5/2020 | |
| KR | 1020170065965 | A | * | 6/2017 | G06F 17/50 |
| WO | 2015179603 | A1 | | 11/2015 | |

OTHER PUBLICATIONS

Eschweiler et al., "Test Driven Development for Device Drivers and Rapid Hardware Prototyping," IEEE, 2015, 9pg. (Year: 2015).*

Slater et al., "Real-time emulation for power equipment development. Part 2: The virtual machine," IEE, 1998, 6pg. (Year: 1998).*

Li et al., "A Novel Hardware-assisted Virtualization Approach for Network Interface Card," IEEE, 2009, 4pg. (Year: 2009).*

Rizzo et al., "VALE, a Switched Ethernet for Virtual Machines," ACM, 2012, 12pg. (Year: 2012).*

Willman et al,. "Protection Strategies for Direct Access to Virtualized I/O Devices," USENIX, 2008, 15pg. (Year: 2008).*

European Patent Office, Office Action Issued in Application No. 21180257.4, Mar. 21, 2024, Germany, 6 pages.

* cited by examiner

VIRTUAL MACHINE FOR DEVELOPING AND TESTING TARGET CODE FOR HARDWARE DESIGNS

CROSS-REFERENCE TO RELATED APPLICATIONS

This application claims priority to U.S. Provisional Patent Application No. 63/070,555 filed on Aug. 26, 2020 titled "Virtual Machine for Developing and Testing Target Code for Hardware Designs," the entire contents of which are hereby incorporated herein by reference.

FIELD

The field of the disclosure relates generally to development and testing of hardware and embedded software and, more specifically, to a proxy virtual machine for developing and testing embedded software for data processing systems.

BACKGROUND

At the outset of new embedded system designs, little is known of the eventual target hardware design or the embedded software that will run on that target hardware. Typically, as the hardware design matures, software development progresses in parallel, undergoing numerous iterations of development and testing. The development and testing are generally carried out on hardware other than the eventual target hardware, for example, within an integrated development environment (IDE) on a personal computer (PC) running a commercial operating system (OS). Consequently, there may be "gaps" in the fidelity of at least some testing that can be carried out while the hardware design is incomplete. There may also be gaps in fidelity due to techniques such as application software re-hosts that enable re-hosted application software to run on a PC, but not other elements of the target hardware software stack, such as a real-time OS. Those gaps may result in delays in full-fidelity testing of target software and target hardware, which may result in late detection of problems, which may result in further iterations of development and testing when nearing completion of the embedded system development.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

One example is directed to a host computer for developing, testing, and executing target code includes a memory storing a proxy VM, and a host CPU. The proxy VM emulates target hardware having an incomplete design. The proxy VM includes a virtual processor for emulating a target processor. The proxy VM includes an emulated memory coupled to the virtual processor over a virtual memory bus. The emulated memory includes at least one portion storing the target code. The host CPU is configured to execute the proxy VM to emulate the target hardware. The proxy VM, upon execution by the host CPU, is configured to execute, by the virtual processor, the target code.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

Figure 1:
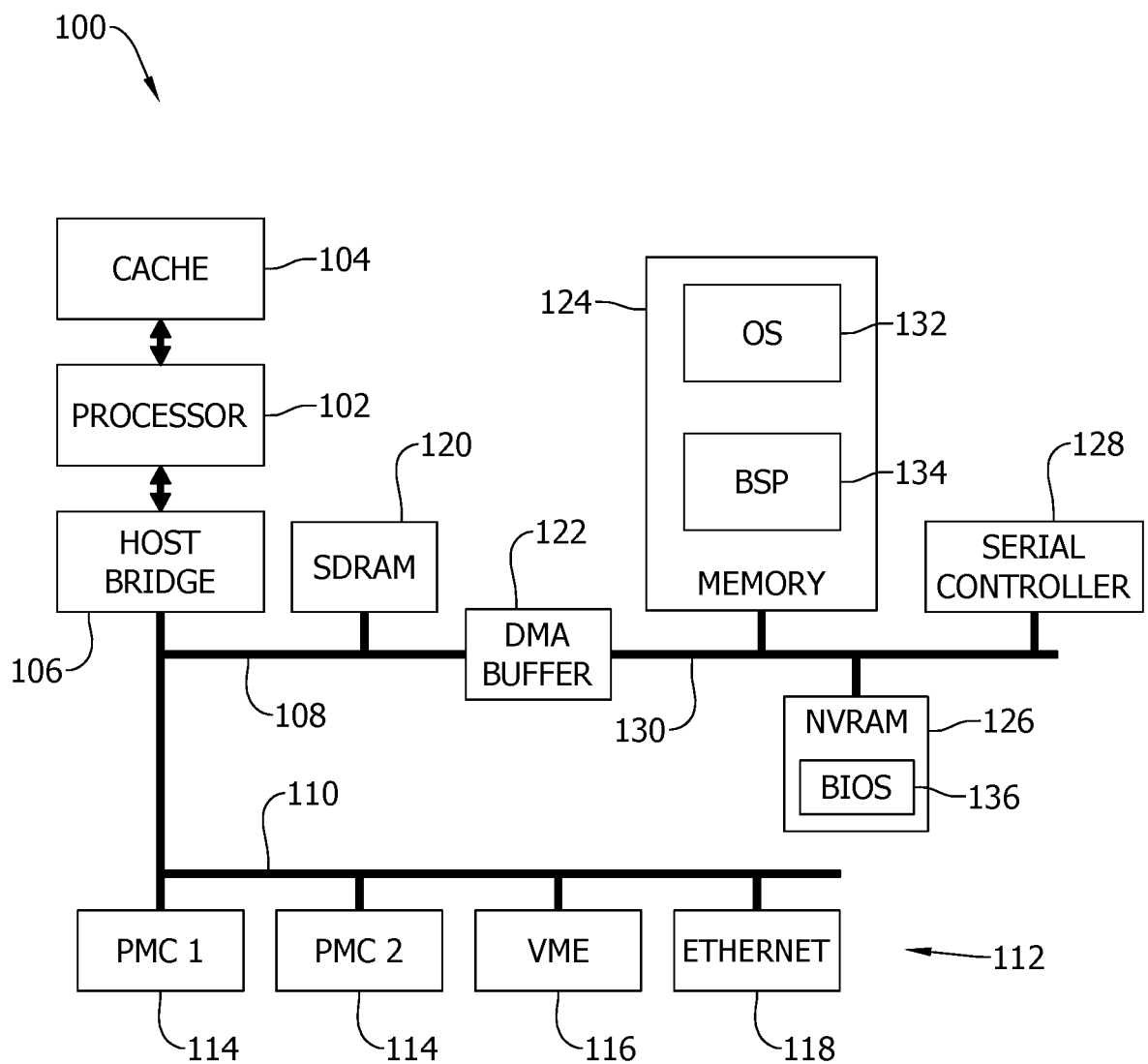
FIG. 1 is a block diagram of an example avionics device.

Corresponding reference characters indicate corresponding parts throughout the several views of the drawings. Although specific features of various examples may be shown in some drawings and not in others, this is for convenience only. Any feature of any drawing may be referenced and/or claimed in combination with any feature of any other drawing.

DETAILED DESCRIPTION

Examples herein provide at least some testing that can occur earlier in the development cycle through use of virtualized hardware within a virtual machine (VM). Virtualization refers to the imitation, or emulation, of a given unit of hardware by a software program, such as a VM, executing on a local, or host, computer via a hypervisor. Virtualization enables testing of target software without modification through software re-hosts or the need for a complete target hardware test bench, which can be costly and in high demand for large or complex system development. Virtualizing target hardware, such as, for example, a single board computer (SBC) or a communication bus controller, generally requires detailed knowledge of the specific target hardware and firmware to build a VM that will imitate, or emulate, the target hardware with comparable functionality to the genuine target hardware. Target hardware, as used herein, refers to a unit of actual hardware for an embedded system or data processing system that is virtualized by the VM.

Examples herein provide a VM that closely matches the target hardware available to carry out early development and testing of either target hardware or target software. Consequently, virtualization is leveraged while the hardware design is under development.

For the purpose of this disclosure, the terms "virtualization" and "emulation" are used interchangeably to refer to a VM where any aspect of target hardware is being emulated, although the host computer may incorporate one or more other aspect of target hardware.

The host computer disclosed provides a proxy VM for developing and testing target software, or target code, for an incomplete hardware design for an embedded system. More specifically, the proxy VM includes only core aspects of a hardware design that are known at early stages of design. For example, the processor type and OS are typically determined in early stages of design, i.e., in an incomplete hardware design. Other aspects, such as firmware for field programmable gate array (FPGAs) and application specific integrated circuits (ASICs), or designs for input/output (I/O) devices, generally are not determined until much later in the hardware design process, which could be months or years after the core aspects of the hardware design are determined. Accordingly, many aspects of the target hardware for the embedded system may change over the course of development, including requirements, designs, interfaces, and input and output data definitions.

The proxy VM, which includes at least an emulation of the target processor and the target OS, enables early development and testing of application software using an IDE, compiler, and other development tools for the target OS, or another off-the-shelf OS that is the same or very similar to the target OS. For the purpose of this disclosure, the term "development tool" refers to any software module, program, library, or other application that can be used in the development, testing, or execution of software under development, or in the development or testing of target hardware. For example, the OS for the proxy VM utilizes the same or very similar stack as the target OS. In alternative embodiments, the OS need not be similar to the target OS, although the similar OS is advantageous for the efficiencies gained, for example, in developing and testing for a single set of development tools for the target OS. In other alternative embodiments, the proxy VM may omit the target OS to operate with "bare metal." In such an embodiment, development and testing may still be carried out using an IDE, compiler, debugger, or other development tools for the bare metal implementation. Early application software often includes atomic-level functionality, application programming interfaces (APIs), and device drivers (once target I/O devices are designed). These early software components are amenable to "white box" testing and typically need not interface directly with hardware aspects of the embedded system. Moreover, early iterations of target hardware and device drivers may be emulated to test and evaluate hardware design options. Such early leveraging of virtualization eliminates re-work and re-hosting effort later in development that often results from differences in the OS and IDE that run on a typical developers' PC. The differences between the development, or "re-hosted," environment and the target environment are often resolved later in development when a complete hardware design is available.

FIG. 1 is a block diagram of example target hardware for an embedded system 100. Embedded system 100 may be an avionics system, for example, a flight management computer (FMC) or a flight control computer (FCC). Although the disclosed systems and methods are sometimes described in terms of avionics, the systems and methods may also be applied in any other computing system that could benefit from reduced development cycles, for example, for land, marine, or space vehicles.

FIG. 1 illustrates and example complete design of embedded system 100. Embedded system 100 includes a processor 102 directly coupled to a memory cache 104, such as a level 1 or level 2 cache. Embedded system 100 also includes a host bridge 106 coupled directly to processor 102 via, for example, a front side bus. Host bridge 106 controls communication with processor 102 over, for example, a memory bus 108, such as an X-bus, and an I/O, or peripheral, bus 110, such as a peripheral component interconnect (PCI) bus, PCI express, PCI-X, integrated drive electronics (IDE) bus, serial advanced technologies attachment (SATA) bus, or any other suitable communication media for connecting I/O devices 112 to processor 102. Host bridge 106 may be implemented on a processing chip, such as an ASIC or FPGA, and may include additional functionality, such as, for example, an interrupt controller. I/O devices 112 may include, for example, sensors, communication interfaces, peripheral interfaces, or other peripheral hardware devices, which may be implemented on PCI mezzanine cards (PMCs) 114. Embedded system 100 includes an additional bus bridge including a Versa Module Eurocard (VME) bus controller 116. Embedded system 100 includes at least two communication interfaces for transmitting and receiving over a communication bus: an Ethernet controller 118 and a serial controller 128. In certain embodiments, I/O devices may include peripheral interfaces such as audio or video interconnects.

Memory bus 108 connects various memory devices to processor 102 through host bridge 106. Memory devices may include, for example random access memory (RAM) such as synchronous dynamic RAM (SDRAM) 120 that is generally only available to processor 102. Embedded system 100 includes a direct memory access (DMA) buffer 122 on memory bus 108 between host bridge 106 and additional memory devices that may be accessed by other devices in addition to processor 102. For example, embedded system 100 includes memory 124 for large storage, non-volatile RAM (NVRAM) 126, and a serial bus controller 128 coupled to a high-speed bus 130, such as a PCI-X bus. DMA buffer 122 enables access to memory 124 and NVRAM 126 without consuming processing cycles of processor 102.

Memory 124 provides storage for, for example, an OS 132 and a board support package (BSP) 134 for embedded system 100. Memory 124 may also store other application software and data for embedded system 100. NVRAM 126 is generally a significantly smaller volume of memory reserved for low-level configuration data, such as a basic input output system (BIOS) 136, or "bootloader."

Figure 2:
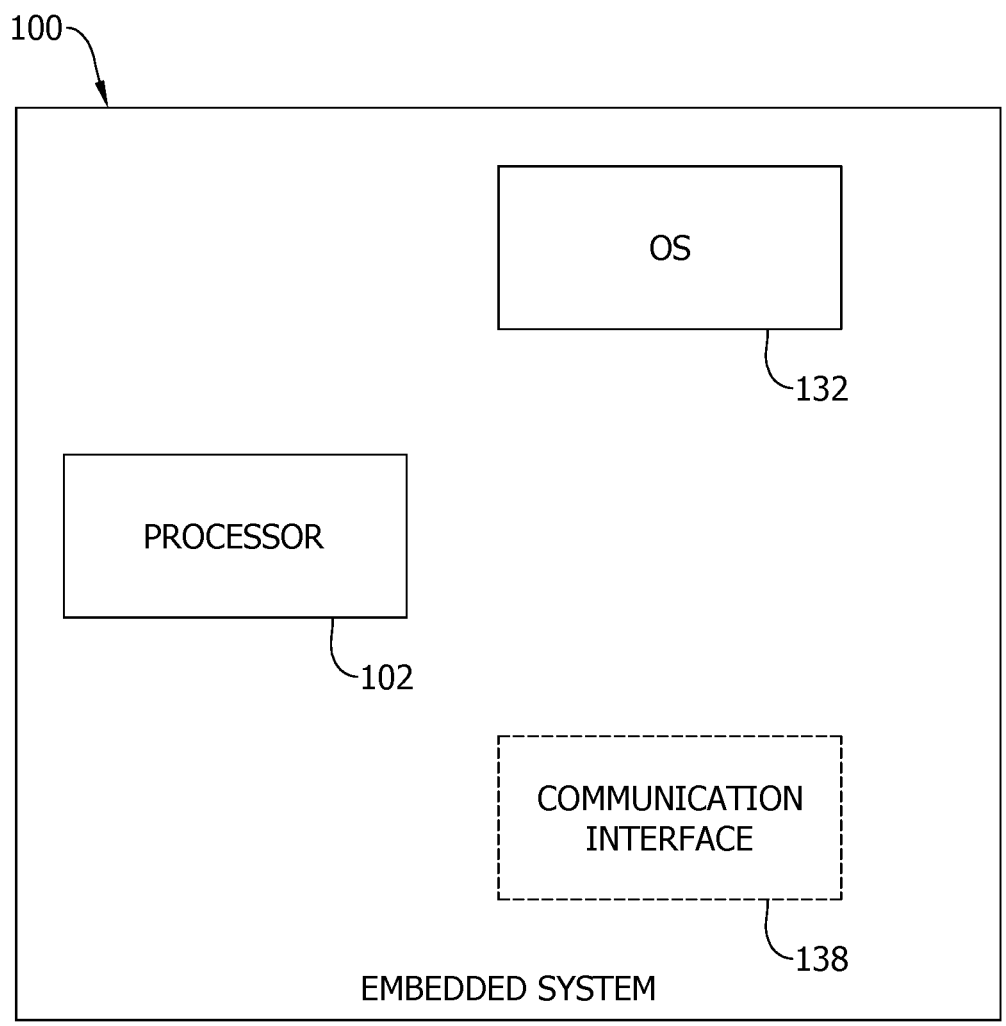
FIG. 2 is a block diagram of an example host computer for emulating the avionics device shown in FIG. 1.

FIG. 2 is a block diagram of an incomplete hardware design for target hardware for embedded system 100. In early stages of development, when the hardware design is "incomplete," only core aspects of the hardware design are known, such as processor 102 and OS 132. An incomplete design may include various aspects that are specified in requirements, but designs or hardware device selections for those aspects are uncertain and may change. Conversely, a complete hardware design would include all hardware device selections and all hardware design aspects complete. As the hardware design progresses, the still incomplete hardware design may evolve to include certain I/O devices 112, such as a communication interface 138. Communication interface 138 may include, for example, an ARINC 429 or a MIL-STD-1553 PCI mezzanine card. Communication interface 138 may also be an Ethernet controller that is the same or similar to Ethernet controller 118. In some embodiments, communication interface 138 may include a selected Ethernet controller that is not similar to the eventual target Ethernet controller 118, which is acceptable so long as it sufficiently supports standard Ethernet protocols. The incomplete hardware design otherwise generally lacks any I/O devices, fully implemented memory or peripheral buses, or fully implemented firmware for ASICs or FPGAs.

Figure 3:
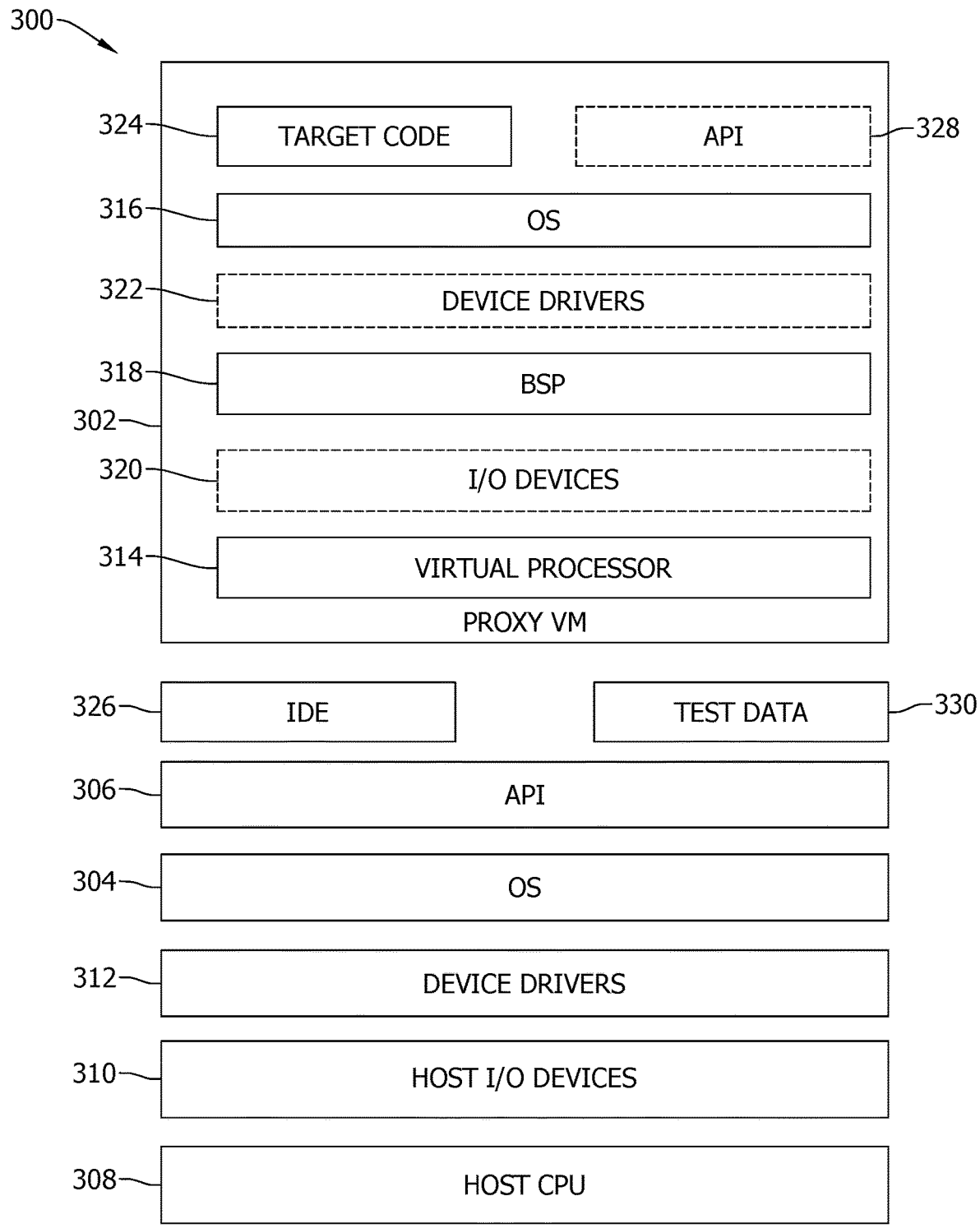
FIG. 3 is a block diagram of an example virtual machine for emulating the avionics device shown in FIG. 1.

FIG. 3 is a block diagram of an example high-fidelity software test architecture 300 for a desktop test environment. Architecture 300 is generally embodied on a desktop computer, e.g., a PC, or "host computer," rather than a hardware test bench that includes genuine target hardware. Architecture 300 may also be implemented on a cloud computing platform that utilizes PC virtual machines or servers. In certain embodiments, architecture 300 may be implemented on a mobile computing device, such as a tablet computer or smart phone. Architecture 300 includes a proxy VM 302 that emulates core aspects of the otherwise incomplete hardware design for embedded system 100 shown in FIG. 2. Proxy VM 302 executes, or runs, on top of an OS 304 and a hardware abstraction layer for the host computer. For the purpose of this disclosure, a hardware abstraction layer generally refers to APIs 306 that include, for example, interfaces for interacting with OS 304, such as inter-process communication mechanisms (e.g., shared memory or sockets). In certain embodiments, APIs 306 may also include a hypervisor for orchestrating operation of proxy VM 302. The host computer generally includes a host central processing unit (CPU) 308 and various host I/O devices 310. Host I/O devices 310 may include, for example, a graphics interface including a graphics processing unit (GPU), audio peripheral devices, a network interface controller (NIC), a keyboard and mouse, or other peripheral devices. In certain embodiments, architecture 300 may include target hardware in host I/O devices 310. Architecture 300 includes device drivers 312 that interface among host I/O devices 310, OS 304, APIs 306, and any application software that is executed that interacts with host I/O devices 310. For example, proxy VM 302 interacts with host I/O devices 310 through APIs 306, OS 304, and device drivers 312.

Proxy VM 302 generally includes a virtual processor 314 that emulates processor 102 of embedded system 100 when processor 102 does not match the processor for the host computer. Alternatively, proxy VM 302 may omit virtual processor 314 if target processor 102 matches that of the host computer. Proxy VM 302 also includes an OS 316 and a BSP 318 corresponding to the combination of emulated hardware and OS 316. OS 316 and BSP 318 are stored in one or more sections of emulated memory connected to virtual processor 314 via a virtual memory bus. Such a virtual memory bus, in certain embodiments, is a conceptual memory bus, or memory construct, implemented in the virtualization layer to enable construction of a memory map and to enable the transfer of data between the VM and host hardware. OS 316 is the same or very similar to OS 132 for embedded system 100. BSP 318 includes configuration information for virtual processor 314 to run OS 316, including, for example, memory mappings and interrupt mappings. Notably, at early stages of development for embedded system 100, when the hardware design is incomplete, proxy VM 302 generally does not include complete emulated I/O devices 320 for target hardware I/O devices 112 in embedded system 100, or a complete emulated peripheral bus. Consequently, target code generally lacks corresponding device drivers 322 for emulated I/O devices 320 or an emulated peripheral bus, although later iterations of proxy VM 302 may ultimately incorporate those virtualized components as their designs mature.

Architecture 300 includes target code 324 that is often developed within an IDE 326 that operates with OS 316. Again, in early stages of development, target code 324 typically includes application software for only atomic functionality. As development progresses, target code 324 may grow to include hardware abstraction layers, or APIs 328, and device drivers 322 once target I/O devices are designed and emulated I/O devices 320 are available. Target code 324 can generally be developed and tested with IDE 326, or other test environment mechanisms, with basic test data 330. Test data 330 generally is stored in host memory, but could also be stored with target code 324 on proxy VM 302 for the purpose of "white box testing."

The low level functionality in target code 324 generally does not interact with emulated I/O devices 320, and at least not directly. Rather, target code 324 generally would interact with emulated I/O devices 320 through APIs 328. As both the hardware design and the embedded software evolve, target code 324 can exercise APIs 328 and eventually device drivers 322 and emulated I/O devices 320.

Emulated I/O devices 320 may include virtual hardware that is distinct from target hardware of embedded system 100 or will not exist in the completed target hardware. For example, the proxy VM 302 may include an emulated Ethernet controller for communicating during testing and development until the design of the target hardware for embedded system reaches a point where the target hardware for such communication matures. For example, for avionics systems that often utilize standardized communication buses, such as an ARINC 429 or MIL-STD-1553 bus, an emulated Ethernet controller enables communication until target hardware PCI mezzanine cards are designed or selected for the ARINC 429 or MIL-STD-1553 bus. Likewise, proxy VM 302 may omit the emulated Ethernet controller or other emulated I/O devices 320 in later stages of the design of embedded system 100. Proxy VM 302 may, in certain embodiments, include another virtual peripheral bus to connect, or couple, proxy VM 302 to host hardware, such as a physical host I/O device. This enables the VM to communicate with devices outside of the physical host over a virtual peripheral bus connected to a physical peripheral bus in the virtualization layer.

Target code 324 can be developed and tested within proxy VM 302. Virtual processor 314 executes OS 316. The host OS 304 may also execute IDE 326 or other target code development tool within OS 316. Virtual processor 314 reads-in target code 324 and test data 330, particularly test input data, through an emulated I/O device 320, such as a virtual communication interface, e.g., an emulated Ethernet controller. In certain embodiments, if I/O device 320 is unavailable in proxy VM 302, because, for example, it is too early in development of embedded system 100, then target code 324 and test data 330 can be loaded directly into emulated memory in proxy VM 302, and will be available when target code 324 boots up on proxy VM 302. Virtual processor 314 then executes target code 324 to operate on the test input data, and writes-out test output data over the virtual communication interface in response to execution of target code 324. In embodiments where the communication interface is not available in proxy VM 302, test output data can be written to emulated memory in proxy VM 302 for post-processing for verification and validation.

As the hardware design progresses further and certain additional target hardware becomes available, such target hardware may be incorporated into host I/O devices 310 within the host computer. Accordingly, corresponding APIs 328 and device drivers 322 for that target hardware are incorporated into proxy VM 302, and target code 324 can interact through those components that are mapped to corresponding APIs 306 and device drivers 312 for the target hardware in the host computer.

Figure 4:
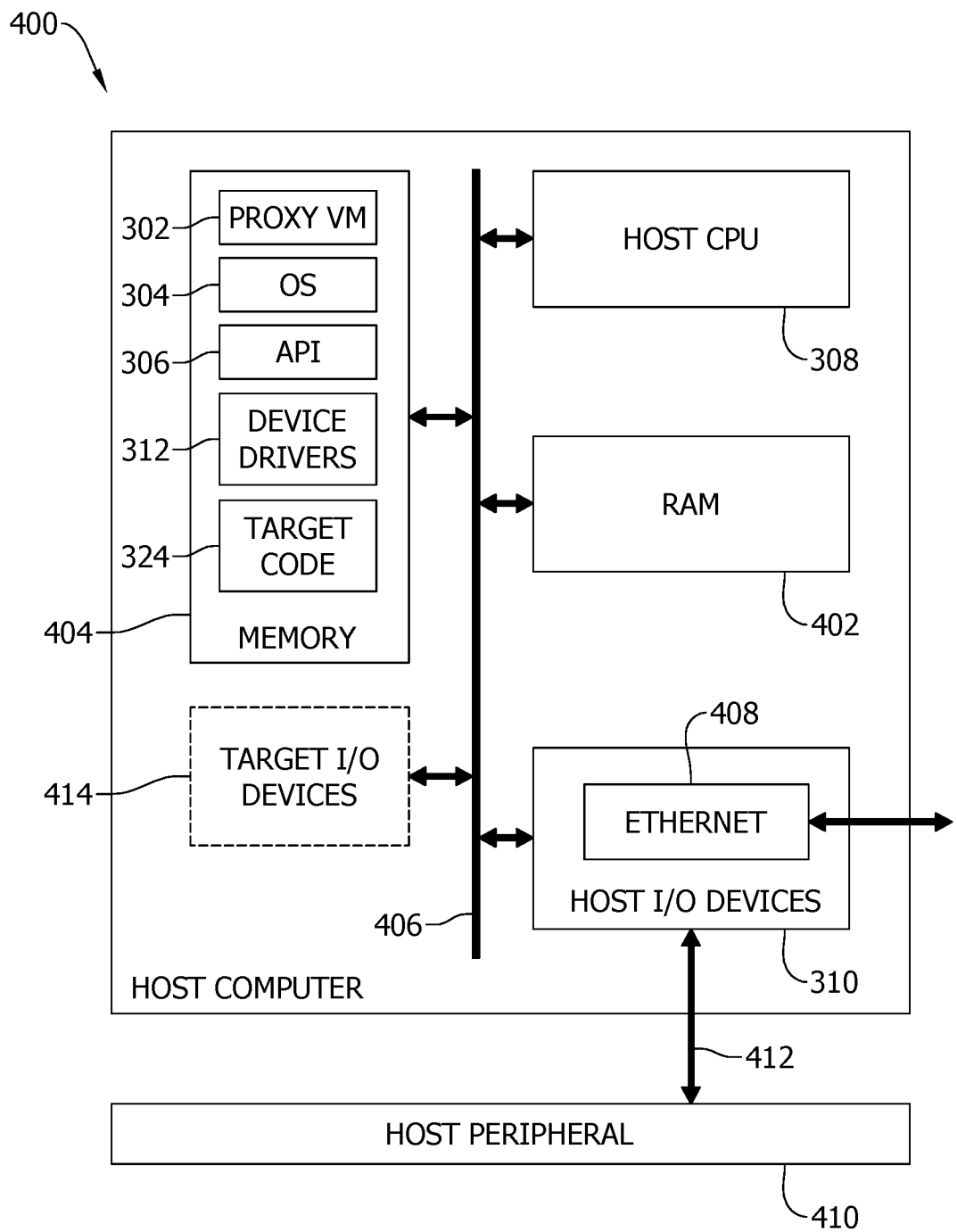
FIG. 4 is a block diagram of an example host computer.

FIG. 4 is a block diagram of an example host computer 400 for emulating target hardware of embedded system 100 shown in FIG. 1. Host computer 400 can include, for example, a desktop PC, server PC, a cloud computing platform (e.g., a VM), a mobile computing device (e.g., tablet computer or smartphone), training system, or other suitable computing system. Host computer 400 includes host CPU 308 coupled to RAM 402 and host memory 404 via a physical bus 406 that includes one or more memory bus, communication bus, or peripheral bus. Host memory 404 is a computer-readable memory that includes a section storing proxy VM 302, a section storing OS 304, a section storing APIs 306, a section storing device drivers 312, and a section storing target code 324. In alternative embodiments, one or more section of host memory 404 may be omitted and the data stored remotely. For example, in certain embodiments, target code 324 may be stored remotely on a server or mass-storage device, and made available over a network to host CPU 308 and proxy VM 302.

Host computer 400 also includes host I/O devices 310, which may include, for example, a communication interface such as an Ethernet controller 408, or a peripheral interface for communicating with a host peripheral device 410 over a peripheral link 412. Host I/O devices 310 may include, for example, a GPU for operating a display peripheral over a display link.

Host computer 400, in certain embodiments, may include target I/O devices 414 once the design or selection of such devices is completed, or near completed, for the target hardware of embedded system 100. For example, in one embodiment, host computer 400 and, more specifically, target I/O devices 414 may include an ARINC 429 or MIL-STD-1553 PCI mezzanine card that is the same as the target hardware device for embedded system 100, or substantially similar to the target hardware. Likewise, host computer 400, in such embodiments, includes devices drivers 312 corresponding to those target I/O devices 414. Host computer 400 may include a mapping, in a virtualization layer (e.g., within APIs or a hypervisor), of an emulated target I/O device 414 to a physical target I/O device 414 residing in host computer 400.

Figure 5:
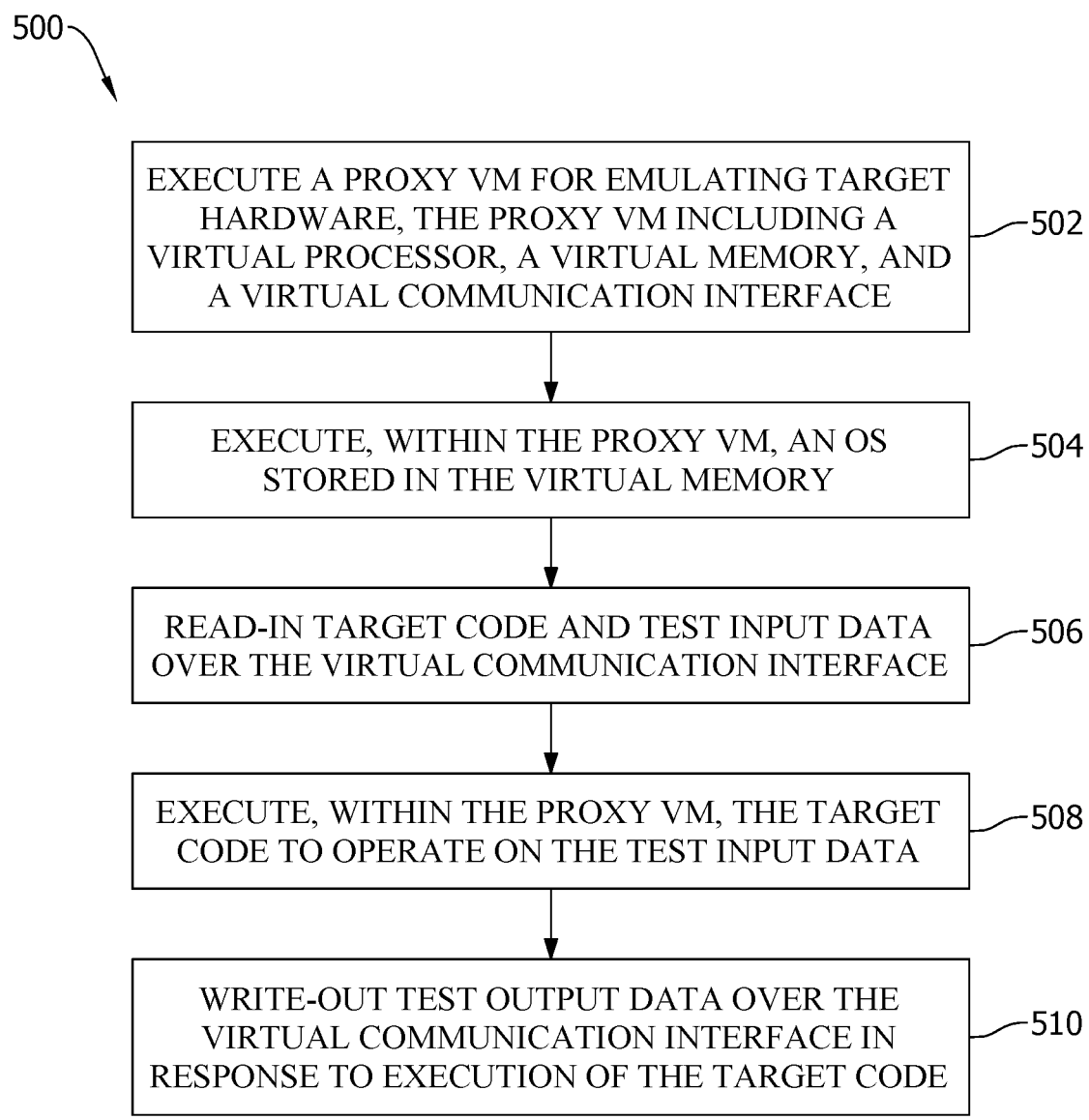
FIG. 5 is a flow diagram of an example method of executing graphics function calls in target code executing in a virtual machine emulating the avionics device shown in FIG. 1

FIG. 5 is a flow diagram of an example method 500 of testing target code for target hardware having an incomplete design, such as the target hardware for embedded system 100 shown in FIG. 1. Method 500 may be embodied, for example, in host computer 400 shown in FIG. 4. Host computer 400 executes 502 proxy VM 302 to emulate the target hardware. As shown in FIG. 3, proxy VM 302 includes virtual processor 314, emulated memory, and I/O devices 320 often including, in certain embodiments, a virtual communication interface, such as a virtual Ethernet controller. Host computer 400 executes 504, within proxy VM 302, OS 304 stored in the emulated memory. Host computer 400 and, more specifically, proxy VM 302, reads-in 506 target code 324 and test input data 330 over the virtual communication interface. Target code 324 is then executed 508 within proxy VM 302 and operates on test input data 330. Test output data is then written-out 510 over the virtual communication interface in response to execution 508 of target code 324. In alternative embodiments, test input data 330 may be stored with target code 324 in proxy VM 302 and is available without reading-in 506. Likewise, in certain embodiments, test output data maybe written to emulated memory rather than being written-out 510 over the virtual communication interface.

Proxy VM 302 may also include a BIOS, or bootloader, coupled to virtual processor 314. The bootloader loads OS 316 and BSP 318 from a portion of the emulated memory at startup of proxy VM 302. Host computer 400 may also include one or more development tools, such as IDE 326, that executes within host OS 304. In certain embodiments, OS 316 is omitted and BSP 318 and target code 324 execute on emulated bare metal. Likewise, on such embodiments, one or more development tools, such as IDE 326, execute without OS 316.

In certain embodiments, execution 508 of target code 324 includes executing, within proxy VM 302, at least one functional application that interacts with at least one peripheral hardware abstraction layer, such as API 328, and does not interact directly with the corresponding peripheral hardware, such as I/O device 320, which is typically omitted from an incomplete hardware design for target hardware of embedded system 100. For the purpose of this disclosure, the term "functional application" refers to any portion of program code that does not interact directly with a peripheral hardware device. Peripheral hardware generally includes any unit of hardware that communicates with processor 102 over a data bus (e.g., a memory bus, communication bus, or peripheral bus) as opposed to being integrated with processor 102 or communicating with processor 102 via the front-side bus. For example, referring to embedded system 100 shown in FIG. 1, peripheral hardware devices communicate with processor 102 via memory bus 108 and peripheral bus 110, and through host bridge 106. Additional non-target code may also be executed within proxy VM 302 to test proxy VM 302 itself.

An example technical effect of the methods, systems, and apparatus described herein includes at least one of: (a) providing a proxy VM for target hardware of an embedded system early in development of the embedded system and generally before the target hardware is complete; (b) enabling a development and test environment within the proxy VM that operates within the same or very similar OS and BSP, and executing on an emulated processor that is the same as the target hardware; (c) enabling earlier testing and development of target hardware and target code without re-hosting and without complete virtualization of the target hardware; (d) reducing defects late in development of embedded systems by utilizing high-fidelity early-development testing on the proxy VM; and (e) enabling a user trainer (e.g., a maintenance or operator training system) utilizing a proxy VM that operates within a same, or very similar, OS and BSP, and executing on an emulated processor that is the same as the target hardware.

Some embodiments involve the use of one or more electronic processing or computing devices. As used herein, the terms "processor" and "computer" and related terms, e.g., "processing device", "computing device", and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc—read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in some embodiments, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A host computer comprising:
    a memory configured to store a proxy virtual machine (VM) for emulating target hardware having an incomplete design, the proxy VM including:
        an emulated Ethernet controller;
        a virtual processor for emulating a target processor; and
        emulated memory in communication with the virtual processor via a virtual memory bus, the emulated memory including at least one portion storing target code; and
    a host central processing unit (CPU) configured to:
        execute the proxy VM to emulate the target hardware, wherein the proxy VM, upon execution by the host CPU, is configured to execute, by the virtual processor, the target code to interact with at least the emulated Ethernet controller; and
        update the proxy VM to omit the emulated Ethernet controller and to include a target hardware I/O device, wherein the updated proxy VM is reconfigured to execute, by the virtual processor, the target code to interact with at least the target hardware I/O device.

2. The host computer of claim 1, wherein the proxy VM, upon execution by the host CPU, is further configured to execute at least one target code development tool.

3. The host computer of claim 1, wherein the target code comprises at least one functional application that interacts with at least one peripheral hardware abstraction layer, and does not interact with corresponding peripheral hardware omitted from the incomplete design.

4. The host computer of claim 1, further comprising a peripheral hardware device included in the target hardware, wherein the proxy VM further includes a hardware abstraction layer corresponding to the peripheral hardware device and configured to use host drivers for the peripheral hardware device upon execution of the target code by the proxy VM.

5. The host computer of claim 1, wherein the proxy VM includes a virtualized peripheral hardware device corresponding to peripheral hardware that is not included in a complete design of the target hardware.

6. The host computer of claim 1, wherein the proxy VM further comprises a virtual peripheral bus coupling the proxy VM emulated I/O devices and physical host I/O devices.

7. The host computer of claim 1, wherein the emulated memory further includes a portion storing an operating system (OS) and a board support package (BSP).

8. The host computer of claim 1, wherein the emulated Ethernet controller is coupled to an emulated peripheral bus, wherein the emulated memory further includes a portion storing test input data, and wherein the proxy VM, upon execution by the host CPU, is further configured to:
    execute, by the virtual processor, the target code to operate on the test input data; and
    write-out test output data over the emulated Ethernet controller in response to execution of the target code.

9. A method of executing target code for target hardware having an incomplete design, the method comprising:
    executing a proxy virtual machine (VM) for emulating the target hardware for the incomplete design, the proxy VM including a virtual processor, an emulated memory, and a virtual communication interface comprising an emulated Ethernet controller;
    executing, within the proxy VM, the target code stored in the emulated memory to interact with at least the emulated Ethernet controller;

gaining access to input data within the proxy VM;
operating, by the target code, on the input data;
writing output data over the virtual communication interface in response to execution of the target code;
updating the virtual communication interface to omit the emulated Ethernet controller and to include a target hardware I/O device; and
executing, within the proxy VM, the target code in the emulated memory to interact with at least the target hardware I/O device.

10. The method of claim 9 further comprising gaining access, by a host processor, to output data over a virtual bus within the proxy VM.

11. The method of claim 9, further comprising executing, within the proxy VM, an operating system (OS) stored in the emulated memory.

12. The method of claim 11, wherein the proxy VM further includes a bootloader coupled to the virtual processor and configured to load the OS and a board support package (BSP) from a portion of the emulated memory at startup of the proxy VM.

13. The method of claim 9, further comprising executing at least one target code development tool coupled to the proxy VM over the virtual communication interface.

14. The method of claim 9, wherein executing the target code comprises executing, within the proxy VM, at least one functional application that interacts with at least one peripheral hardware abstraction layer, and does not interact with corresponding peripheral hardware omitted from the incomplete design.

15. A non-transitory computer-readable memory storing a proxy virtual machine (VM) for emulating target hardware having an incomplete design, the proxy VM including:
a virtual processor for emulating a target processor;
emulated memory coupled to the virtual processor over a virtual memory bus, the emulated memory including at least one portion storing a board support package (BSP) and target code; and
a virtual communication interface coupled to virtual processor via an emulated peripheral bus, wherein the virtual communication interface comprises an emulated Ethernet controller;
wherein the proxy VM, upon execution by a host central processing unit (CPU), is configured to:
execute the target code stored in the emulated memory to interact with at least the emulated Ethernet controller;
gain access to input data within the proxy VM;
operate, by the target code, on the input data;
write output data over the virtual communication interface in response to execution of the target code;
update the virtual communication interface to omit the emulated Ethernet controller and to include a target hardware I/O device; and
execute the target code in the emulated memory to interact with at least the target hardware I/O device.

16. The non-transitory computer-readable memory of claim 15, wherein the emulated memory of the proxy VM includes:
virtual random access memory (RAM) coupled to the virtual processor over the virtual memory bus; and
virtual non-volatile memory coupled to the virtual memory bus and storing the BSP and the target code.

17. The non-transitory computer-readable memory of claim 16, wherein the proxy VM further includes a bootloader coupled to the virtual processor and configured to load an operating system (OS) and the BSP from the virtual non-volatile memory at startup.

18. The non-transitory computer-readable memory of claim 15, wherein the target hardware and the proxy VM each do not include device drivers for peripheral hardware.

19. The non-transitory computer-readable memory of claim 15, wherein the target processor and an operating system (OS) form the incomplete design.

20. The computer-readable memory of claim 15, wherein the proxy VM includes a virtualized peripheral hardware device corresponding to peripheral hardware that is not included in a complete design of the target hardware.

21. A host computer comprising:
a memory configured to store a proxy virtual machine (VM) for emulating target hardware, the proxy VM including:
a virtual communication interface comprising an emulated Ethernet controller;
a virtual processor for emulating a target processor; and
emulated memory coupled to the virtual processor over a virtual memory bus, the emulated memory including at least one portion storing target code; and
a host central processing unit (CPU) configured to:
execute the proxy VM to emulate the target hardware, wherein the proxy VM, upon execution by the host CPU, is configured to execute, by the virtual processor, the target code to interact with at least the emulated Ethernet controller; and
update the virtual communication interface to omit the emulated Ethernet controller, wherein the updated proxy VM is reconfigured to execute the target code to interact with at least a target hardware I/O device.

22. A trainer system for a target hardware device, the trainer system comprising:
a user interface configured to receive input data from a user;
a host computer coupled to the user interface, the host computer comprising:
a memory configured to store a proxy virtual machine (VM) for emulating the target hardware device, the proxy VM including:
an emulated Ethernet controller;
a virtual processor for emulating a target processor; and
emulated memory coupled to the virtual processor over a virtual memory bus, the emulated memory including at least one portion storing target code; and
a host central processing unit (CPU) configured to:
execute the proxy VM to emulate the target hardware, wherein the proxy VM, upon execution by the host CPU, is configured to execute, by the virtual processor, the target code to interact with at least the emulated Ethernet controller; and
update the proxy VM to omit the emulated Ethernet controller and to include a target hardware I/O device, wherein the updated proxy VM is reconfigured to execute the target code to interact with at least the target hardware I/O device.

23. A test bench for an embedded system, the test bench comprising:
a host computer comprising:
a host communication interface configured to receive input test data;
a memory configured to store a proxy virtual machine (VM) for emulating a target hardware device having an incomplete design, the proxy VM including:

an emulated Ethernet controller;
a virtual processor for emulating a target processor; and
emulated memory coupled to the virtual processor over a virtual memory bus, the emulated memory including at least one portion storing target code; and a host central processing unit (CPU) configured to:
execute the proxy VM to emulate the target hardware, wherein the proxy VM, upon execution by the host CPU, is configured to execute, by the virtual processor, the target code to interact with at least the emulated Ethernet controller to operate on the input test data; and
update the proxy VM to omit the emulated Ethernet controller and to include a target hardware I/O device, wherein the updated proxy VM is reconfigured to execute the target code to interact with at least the target hardware I/O device.

\* \* \* \* \*